Aug. 2, 1927.  
H. E. BONER  
1,637,468  
CONTACTING MEANS  
Filed April 21, 1926  
2 Sheets-Sheet 1
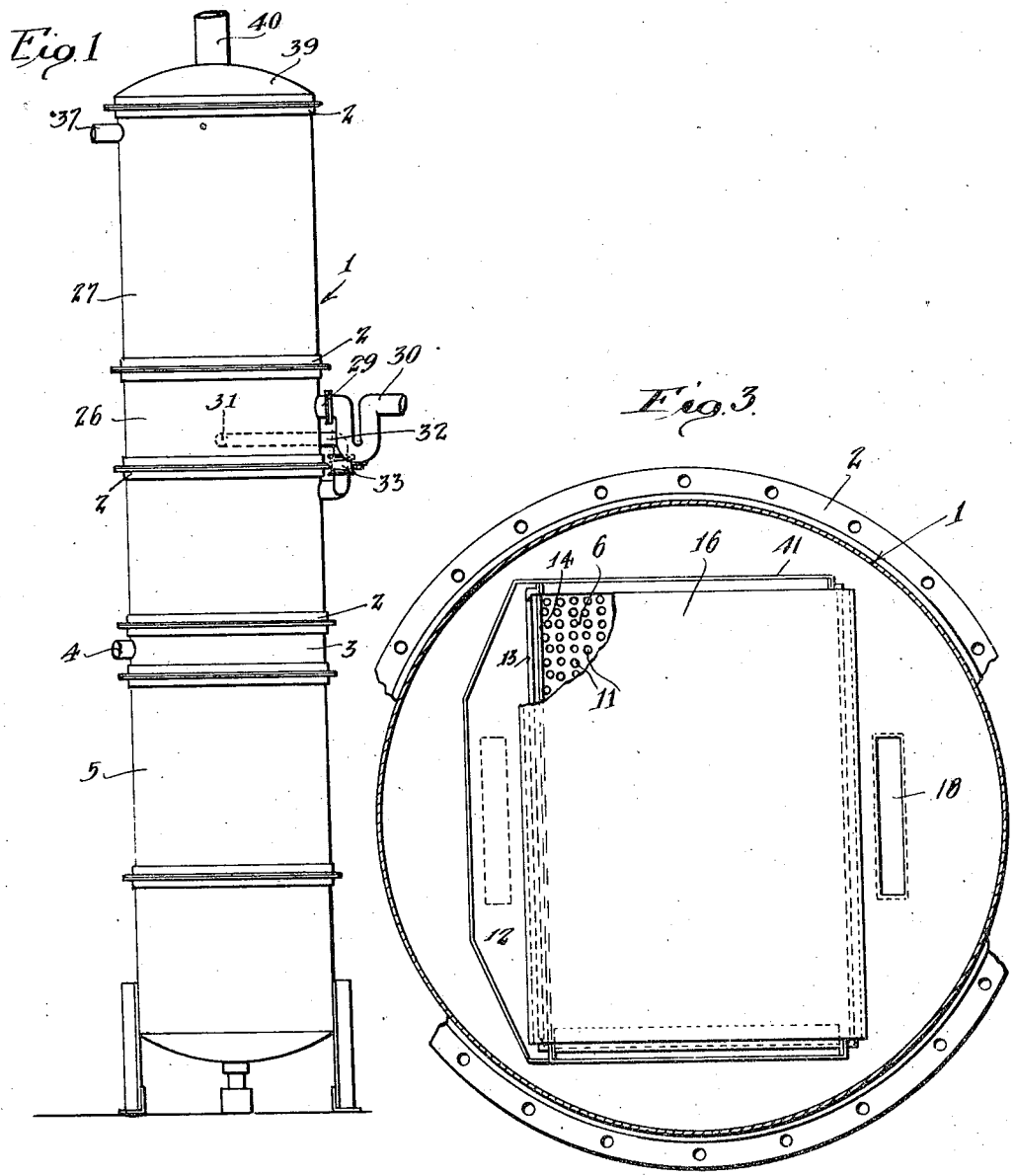
Inventor  
Halbert E. Boner  
By Lyon & Lyon  
Attorney

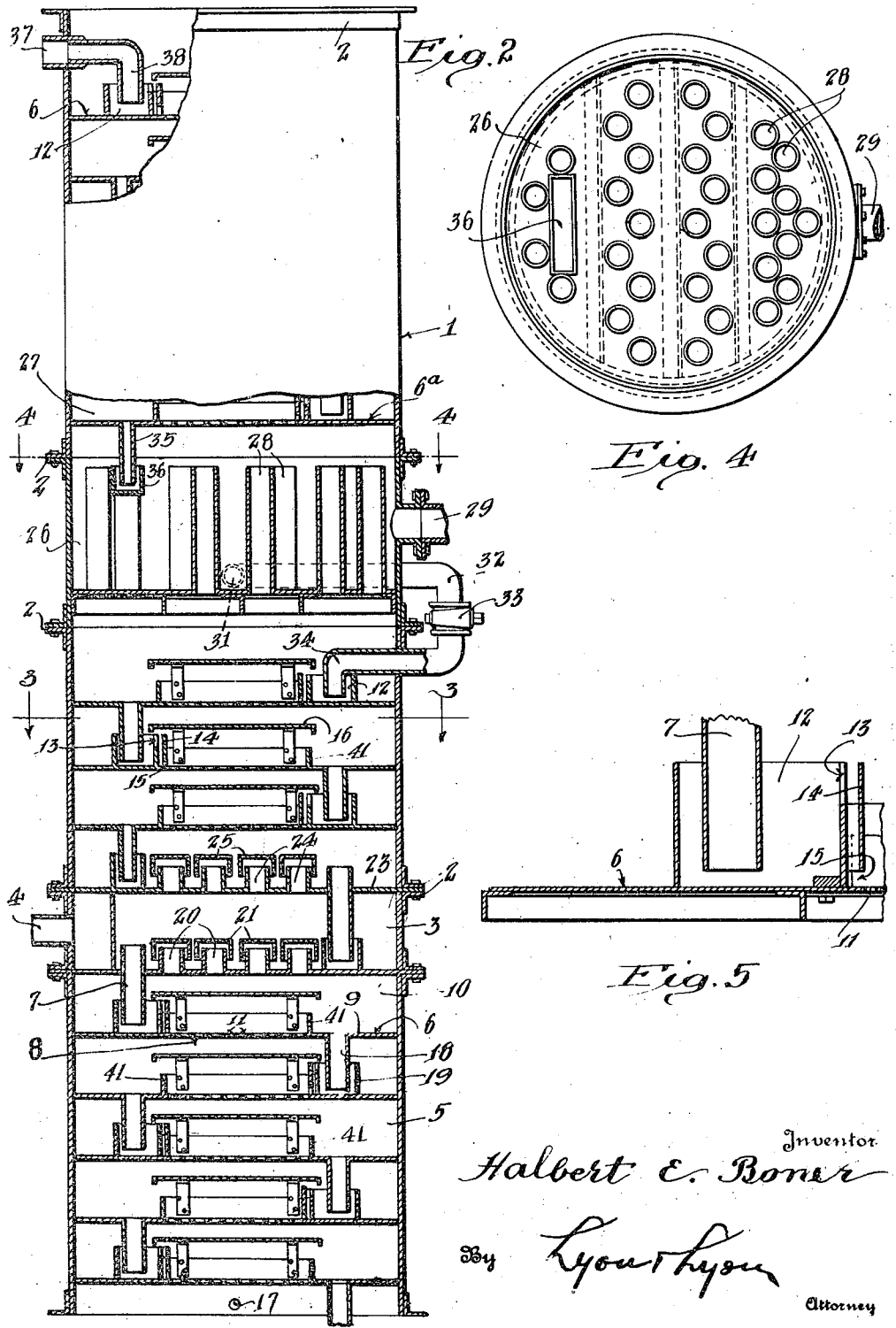

Patented Aug. 2, 1927.

1,637,468

UNITED STATES PATENT OFFICE.

HALBERT EVANS BOWER, OF LOS ANGELES, CALIFORNIA.

CONTACTING MEANS.

Application filed April 21, 1926. Serial No. 103,464.

This invention relates to means for effecting intimate contact of a liquid with a gas or vapor, or effecting a maximum surface exposure of a liquid to a gas or vapor; this action usually takes place within a shell or tower and the liquid passes downwardly as the gas or vapor passes upwardly. The means usually employed to effect this intimate contact consists of one or more screens or plates in series, one above the other, each plate having means for introducing liquid onto it, with means for allowing only the liquid to flow downwardly from the plate; means is usually provided such as wire mesh, or perforations in the plate, or a solid plate having nipples with cap seals placed over each nipple, all arranged so that gas or vapor passing upwardly through the wire mesh, perforations or nipples, contacts with the liquid on that plate.

In the use of such apparatus it is desirable to have the gas or vapor attain a considerable velocity through the liquid in order that this contact may result in the production of minute bubbles or froth so that the maximum surface of liquid is formed for exposure to the gas or vapor and also so that the gas or vapor bubbles may be deformed, that is to say, elongated, in order to have a maximum exposure of gas or vapor to the liquid. As a result of using such velocity at points of contact the liquid splashes upwardly or minute droplets or bubbles are carried by mechanical entrainment to the plate immediately above, and so on through the shell or tower. This carrying of liquid from a lower to an upper plate interferes seriously with and often completely counteracts the intended action expected from the use of such an apparatus.

Further, in the use of such perforated plates the fresh liquid being introduced onto a plate flows toward an outlet such as an overflow pipe or downspout which serves to introduce the liquid onto the next plate below, or into the space just below, and it may happen that little or no movement of the liquid on certain portions of the plate takes place. The result of this is that the gas or vapor passes through such areas without attaining the desired action. Again, in the use of such apparatus it frequently happens that a froth will be formed that is slow in breaking down; as a result, the flow of the mixture of liquid and gas or vapor through the overflow or downspout provided is very sluggish and seriously interferes with the proper flow of liquid downwardly through the shell or tower; indeed such a sluggish action results in a filling up or flooding of the shell or tower and entirely prevents the desired action.

The general object of this invention is to overcome these objections and to provide a tower that can be driven at a high rate, thereby increasing production; also to provide a construction of a plate for use in series in a shell or tower where intimate contact of a liquid with a gas or vapor is desired whereby the action on any one plate does not detrimentally affect the action on other or adjacent plates, so that such results as may be logically expected from such intimate contact under the imposed conditions of rate of flow of liquid, rate of flow of gas or vapor, temperature, pressure, etc., may be more nearly realized; also to provide a construction which will provide ample opportunity for the breaking down of the froth; also to provide a plate, only a part of which contains wire mesh or perforations so that a splash plate of less area than the plate may be placed over this perforated area, thus preventing direct splashing of the liquid to the plate immediately above, and yet allowing sufficient area around the splash plate, so that the velocity of the gas or vapor around this plate will be too low to effect mechanical entrainment of droplets or bubbles of the liquid with the gas or vapor entering or passing through the plate immediately above; also to provide means for introducing the liquid onto the plate in a comparatively thin broad stream flowing immediately upon the plate itself and not upon or over froth already formed thus facilitating the movement or conveyance of froth already formed, from the perforated area, and in this way lessening the chance of developing a "dead" area over which froth would be displaced very slowly if at all; also to produce an improved plate whereon the liquid after contact with the gas or vapor, whether actually frothed or not, has a definite quiet imperforated area where froth if formed as such is given time to break down or release the entrained gas or vapor and the liquid portion to coalesce before flowing as a liquid through an overflow or downspout.

Further objects of the invention will appear hereinafter.

The invention consists in the novel parts and combination of parts to be described hereinafter, all of which contribute to produce an efficient contact means for a tower or still.

A preferred embodiment of the invention is described in the following specification, while the broad scope of the invention is pointed out in the appended claims.

In the drawings:

Fig. 1 is a side elevation of a fractionating tower or still embodying my invention.

Fig. 2 is a partial section upon an enlarged scale, showing the principal portion of the interior of the tower, and part of the tower in elevation.

Fig. 3 is a horizontal cross section through the tower upon an enlarged scale, taken about on the line 3—3 of Fig. 2, certain parts being broken away, and particularly illustrating the construction of the screen which I prefer to use in this tower.

Fig. 4 is a horizontal section taken about on the line 4—4 of Fig. 2, and particularly illustrating the construction of a re-boiler which constitutes a feature of my invention.

Fig. 5 is a vertical section taken at one edge of one of the screens, and particularly illustrating the means for delivering the current of oil on to the perforate area of the screen.

In practicing my invention I provide an absorption tower, fractionating tower or still consisting of the usual cylindrical casing 1; this casing may be built up of short lengths or cylinders connected together by flanges formed of angle iron 2. In applying the invention to a fractionating tower, at a suitable point, I provide a receiver 3 for crude oil having an inlet 4 through which heated crude oil is pumped into the receiver. The temperature of this oil depends upon what fraction is desired, but for example the temperature may be about 450° F. The oil from the receiver passes through a stripper section 5, the function of which is to take off from the oil the desired fraction and with it perhaps heavier fractions. This stripper section is preferably constructed of a plurality of screens 6 or contact plates. These screens are of a typical form and embody novel features of my invention; and they are preferably substantially the same wherever screens are used within the tower. There may be as many as desired of these screens 6. They are preferably constructed in such a way that the oil current moving across an upper screen moves in a reverse direction from that which it has when crossing the next lower screen. From the receiver 3 the oil passes downwardly through a down-pipe 7 onto the uppermost screen. This screen is substantially of the same construction as the others, that is to say, its middle portion 8 constitutes a perforate area and may be formed of a plate with perforations or of a mesh screen. On the side or edge of the perforate area remote from the point of admission of the oil, the screen has an imperforate area 9, and the space 10 above this imperforate area is intended to operate as a coalescing zone for the froth which passes off of the perforate area.

Suitable means is provided for controlling the admission of the oil so as to prevent it from flowing over the froth, and so as to cause it to flow in a current along the upper face of the plate when it will come in intimate contact with the hot vapors passing up through the perforations 11. In order to accomplish this I prefer to provide an oil trough 12 which extends transversely of the screen and toward one side (see Fig. 3). At one side this oil trough is provided with an outlet such as an elevated overflow outlet 13, which may be formed simply by cutting a long notch in the upper edge of the trough on this side. In a fractionating tower where the oil treated is light, between this outlet and the perforate area of the plate I provide means such as a baffle plate 14, which prevents the overflow of oil from splashing onto the froth. The lower edge of this baffle plate 14 is elevated slightly above the upper face of the screen so as to form a port or passageway 15 through which the oil is guided in a current flowing across the plate. This baffle plate may be omitted in absorption towers.

Above the perforate area of each screen I provide a spatter plate 16 which prevents any possibility of oil from a lower screen being entrained or carried up through the froth on the screen just above it. Below the screens of the stripper section I provide means such as an inlet 17 for admitting the heated gas or vapor, such as steam, and I may use steam of about 220° F., for example. This steam passes upwardly through the perforations in the screens and comes in intimate contact with the currents of oil flowing across the faces of the plates. The plates or screens are constructed in an alternate or reversed manner, that is to say, as illustrated in Fig. 2, on the uppermost screen of the stripper section the oil will flow from left to right, and a down pipe 18 at the right hand side of this screen and at its coalescing area will carry the liquid forming from the froth to the oil trough 19 on the next screen below. On this next lower screen, the oil will flow from right to left and so on down through the entire stripper section.

The vapors accumulating below the receiver 3 are carried through the receiver and preferably directly through the body of oil within the receiver. For this purpose I provide a plurality of bubbling nipples 20 which may be provided with inverted cup-shaped caps 21. In the operation of the apparatus, the vapors pass upwardly from the lower edges of the caps 21 and bubble up through the body of oil in the receiver, passing through the upper wall 23 of the receiver through similar nipples 24 and caps 25. From this point, the vapors pass on up through the perforations of screens 6 which constitute a washing section and which are constructed similar to the screens which are located below the receiver 3. Above the washing section I provide a re-boiler 26 which is located below the fractionating section 27 of the tower and which collects oil accumulating in the fractionating section 27. This re-boiler is constructed in such a way as to permit the hot vapors to pass up through it from the washing section, and for this purpose it is preferably constructed with a plurality of vertical tubes 28 which are open at both ends and the upper ends of which extend above the level of the oil in the re-boiler. This re-boiler has a delivery outlet 29 for oil within it and this outlet is preferably provided with a trap 30 from which the oil may be passed off and cooled for storage purposes, if desired.

Below the level of the outlet 29 the re-boiler has an outlet 31 which communicates by a pipe connection 32 and valve 33 with a spout 34 which delivers distillate oil into the oil trough 12 of the uppermost screen of the washing section. This oil from the re-boiler passes across the screens of the washing section in succession and condenses the heavier vapors which have come up from the stripper section. The lighter vapors pass on up through the tubes 28 of the re-boiler and pass into the fractionating section 27. This section of the tower is constructed of screens 6 similar to the screens of the washing section and stripper section. The lowermost screen 6ª of the fractionating section is provided with a down pipe 35 which delivers the oil coming down from the fractionating section into the re-boiler through an oil seal or trap 36.

As the lighter vapors pass up through the fractionating section I bring them into contact with currents of oil passing across the screens of this section and this oil is preferably the condensate of substantially the desired fraction. For this purpose I would prefer to employ a reflux inlet 37 which brings back some of this condensate from a condenser which receives its supply from the tower or from a similar tower. This inlet 37 has a downpipe 38 which delivers the condensate into an oil trough 12 similar to the oil troughs 12 already described in connection with the stripper section. From this oil trough the oil passes in succession down and across the different screens which compose the fractionating section. The upper head or dome 39 of the fractionating section may be provided with an outlet 40 for the desired fraction which is led off to a cooler preparatory to placing it in storage. The perforate area of each screen is surrounded by a wall 41.

In the operation of the tower it should be understood that as the vapors rise through the perforate sections of the screens they come in intimate contact with the currents of oil flowing across the upper faces of the screens. This produces a considerable amount of froth which is moved by the oil current in the general direction of the coalescing zones of the screens which are located opposite to the point of admission of the oil current which flows across the screen. The froth flows over the wall 41 and breaks down in the coalescing zones, and the liquid from it passes on down to the next screen below. The down-pipes such as 7 and 18 are of course sealed by the oil in the troughs into which they extend. In other words, the screens are mounted so that the vapors can pass up only by going through the perforations.

Any heavier fractions of vapor which find their way into the fractionating section will condense there and be re-boiled in the re-boiler so as to produce the desired lower fraction from them.

It is understood that the embodiment of the invention described herein is only one of the many embodiments this invention may take, and I do not wish to be limited in the practice of the invention, nor in the claims, to the particular embodiment set forth.

What I claim is:—

1. In a fractionating tower, the combination of a receiver for crude oil, a stripper section below the receiver, means for conducting crude oil from the receiver through the stripper section, means for passing heated vapor or gas through the stripper section in intimate contact with the oil passing therethrough, to vaporize the heavier fractions, a re-boiler above the receiver, a fractionating section above the re-boiler, means for conducting condensate of substantially the desired fraction from the exterior, into and through the fractionating section, means for conducting the vapors from the stripper section through the fractionating section in intimate contact with the condensate, and means for leading off the vapors from the fractionating section.

2. In a fractionating tower, the combination of a receiver for crude oil, a stripper section with screens, means for conducting crude oil from the receiver into the stripper section and for guiding the same to flow across the screens, means for passing a heated vapor or gas up through the screens to vaporize the heavier fractions, a re-boiler above the receiver, a fractionating section above the re-boiler and having screens, means for conducting the vapors from the stripper section through the oil receiver, through the re-boiler and through the screens of the fractionating section, means for guiding condensate of substantially the desired fraction across the screens of the fractionating section and into the re-boiler, and means for leading off the vapors from the fractionating section.

3. In a fractionating tower, the combination of a receiver for crude oil, a stripper section below the receiver for taking oil from the receiver and vaporizing a fraction or fractions therefrom, a fractionating section with screens above the receiver, means for conducting the vapors from the stripper section up through the screens of the fractionating section, means for admitting condensate of substantially the desired fraction from the exterior, and passing the same over the screens of the fractionating section, and a re-boiler below the fractionating section for revaporizing the desired fraction from the oil collecting in the re-boiler.

4. In a fractionating tower, the combination of a receiver for crude oil, a stripper section below the receiver for taking oil from the receiver and vaporizing a fraction or fractions therefrom, means for passing oil from the receiver through the stripper section, means for admitting steam to pass upwardly through the stripper section in intimate contact with the oil passing therethrough, a re-boiler above the receiver, means for conducting the vapors from the stripper section through the receiver and through the re-boiler, a fractionating section above the re-boiler, means for admitting condensate of substantially the desired fraction from the exterior to the fractionating section, means for conducting the vapors passing up from the re-boiler into intimate contact with the condensate, and an outlet for the vapors from the fractionating section.

5. In a fractionating tower, the combination of a receiver for crude oil, a stripper section below the receiver for taking oil from the receiver and vaporizing a fraction or fractions therefrom, means for passing oil from the receiver through the stripper section, means for admitting steam to pass upwardly through the stripper section in intimate contact with the oil passing therethrough, a re-boiler above the receiver, means for conducting the vapors from the stripper section through the receiver and through the re-boiler, a fractionating section above the re-boiler, means for admitting condensate of substantially the desired fraction to the fractionating section, means for conducting the vapors passing up from the re-boiler into intimate contact with the condensate, an outlet for the vapors from the fractionating section, and means for washing the vapors with distillate from the re-boiler as they pass upwardly from the stripper section.

6. In a fractionating tower, the combination of a receiver for crude oil, a stripper section composed of a plurality of screens disposed below the receiver and taking oil therefrom, means for admitting steam below the stripper section so that the same passes upwardly in intimate contact with the oil passing over the screens of the stripper section, means for conducting the vapors from the stripper section through the body of oil in the receiver, a washing section above the receiver and comprising a screen through which the vapors pass upwardly, a re-boiler above the washing section with means for conducting distillate from the re-boiler over the screen of the washing section, a fractionating section above the re-boiler comprising screens for bringing the vapors and oil into intimate contact, and an outlet for the vapors from the fractionating section.

7. In a fractionating tower, the combination of a receiver for crude oil, a stripper section composed of a plurality of screens disposed below the receiver and taking oil therefrom, means for admitting steam below the stripper section so that the same passes upwardly in intimate contact with the oil passing over the screens of the stripper section, means for conducting the vapors from the stripper section through the body of oil in the receiver, a washing section above the receiver and comprising a screen through which the vapors pass upwardly, a re-boiler above the washing section with means for conducting distillate from the re-boiler across the screen of the washing section, a fractionating section above the re-boiler comprising screens for bringing the vapors and oil into intimate contact, means for passing condensate of substantially the desired fraction across the screens of the fractionating section, and an outlet for the vapors from the fractionating section.

8. In apparatus of the kind described, a screen having an imperforate area and a perforate area through which heated vapors may pass upwardly, and means for conducting oil onto the face of the screen so that the oil passes across the screen under the froth forming thereabove.

9. In apparatus of the kind described, a screen having an imperforate area and a perforate area, means for passing hot vapors up through the perforations of the perforate area, an oil trough at one side of the perforate area and having an outlet for the oil adjacent the perforate area, means between the outlet and the perforate area for conducting the oil down onto the face of the screen, so that a portion of the oil and vapors form a froth, and a portion of the oil passes across the face of the screen under the froth forming thereon, the movement of the oil across the face of the screen operating to carry the froth onto the imperforate area of the screen, the space over said imperforate area operating as a coalescing zone, and means for conducting the oil downwardly from the coalescing zone.

10. In apparatus of the kind described the combination of a plurality of screens, each screen having a perforate area through which vapors may pass upwardly, and having an imperforate area, the space above which operates as a coalescing zone for froth, an oil trough associated with each screen and operating to deliver a current of oil across the face of the screen and toward the imperforate area thereof, the coalescing zone of each upper screen having means for delivering oil to the oil trough of the next lower screen.

11. In apparatus of the kind described the combination of a plurality of screens, each screen having a perforate area through which vapors pass upwardly, and having an imperforate area with a space above the same operating as a coalescing zone for froth, an oil trough associated with each screen and operating to deliver a current of oil across the face of the screen and toward the imperforate area thereof, the coalescing zone of each upper screen having means for delivering oil to the oil trough of the next lower screen, and a spatter plate covering the perforate area of each screen.

12. In apparatus of the kind described, a screen having a perforate area and an imperforate area and having an oil trough at the side of the perforate area opposite to the imperforate area, the said oil trough having an overflow on its side toward the perforate area with a baffle plate between the overflow and the perforate area of the screen operating to guide the oil overflow from the trough in a current passing along the upper side of the perforate area of the screen whereby the current of oil produces a movement of the froth on the screen toward the imperforate area, the space above said imperforate area operating as a coalescing zone, and means for carrying off the liquid oil forming in the coalescing zone.

13. In apparatus for effecting contact of an oil with a vapor, the combination of a screen in the form of a plate having a perforate area through which the vapor passes upwardly, said plate also having an imperforate area, a wall about the perforate area, means for introducing the oil onto the perforate area, so that the oil comes in contact with the vapor flowing upwardly through the perforate area, operating to produce a froth overflowing the wall about the perforate area onto the imperforate area, said imperforate area operating as a coalescing zone, means for conducting the oil downwardly from the coalescing zone, said plate mounted so that vapor below the plate passes to the space above the plate only after passing through the perforate area.

14. In apparatus for effecting contact of an oil with a vapor, having an upper vapor outlet, the combination of a screen having a perforate area and an imperforate area, means for passing hot vapors up through the perforations of the perforate area, an oil trough located at one side of the perforate area and a wall extending around the remaining boundary of the perforate area, an overflow on the side of the trough toward the perforate area, means for introducing the oil into the trough, means between the trough overflow and the perforate area for conducting the oil down to the face of the perforate area enabling the hot vapors and oil to form bubbling oil and froth, a portion of the oil passing below the level of the bubbling oil or froth over the perforate area, and causing the bubbling oil or froth to overflow the wall about the perforate area onto the imperforate area, said imperforate area operating as a coalescing zone, means for conducting the oil downwardly from the coalescing zone, a super-posed splash plate above the perforate area to prevent oil being blown directly to said vapor outlet, and all arranged so that vapor below passes to the space above only after passing through the perforate area.

15. In apparatus for effecting contact of an oil with a vapor, having an upper vapor outlet, the combination of a screen having a perforate area and an imperforate area, an oil trough located at one side of the perforate area and having a wall extending around the remaining boundary of the perforate area, means for introducing the oil into the trough, an overflow on the side of the trough toward the perforate area for introducing the oil onto the perforate area to come into contact with vapor flowing upwardly through the perforate area and form bubbles and froth from the oil, a portion of said oil flowing under the bubbles and froth and causing the same to overflow the wall about the perforate area onto the imperforate area, said imperforate area operating as a coalescing zone, means for conducting the oil downwardly from the coalescing zone, a superposed splash plate above the perforate area to prevent oil being blown directly to a vapor outlet above, and all arranged so that vapor below passes to the space above only after passing through the perforate area.

16. In a fractionating tower, the combination of a receiver for crude oil, a stripper section below the receiver, means for conducting crude oil from the receiver through the stripper section, means for passing heated vapor or gas through the stripper section in intimate contact with the oil passing therethrough, to vaporize the heavier fractions, a perforated transverse plate above the stripper section, a re-boiler above the receiver and below the said perforated plate, a fractionating section above the re-boiler, a plurality of tubes extending up through the re-boiler for conducting vapors upwardly through the same from the stripper section, the upper ends of said tubes terminating below to said perforated plate, and means for leading off the vapors from the fractionating section.

Signed at Los Angeles, California, this 12th day of April, 1926.

HALBERT EVANS BONER.